Feb. 24, 1948.　　　A. A. JOHNSON　　　2,436,575
AUTOMATIC TOASTER
Filed June 20, 1940　　　6 Sheets-Sheet 1

INVENTOR
Arthur A. Johnson

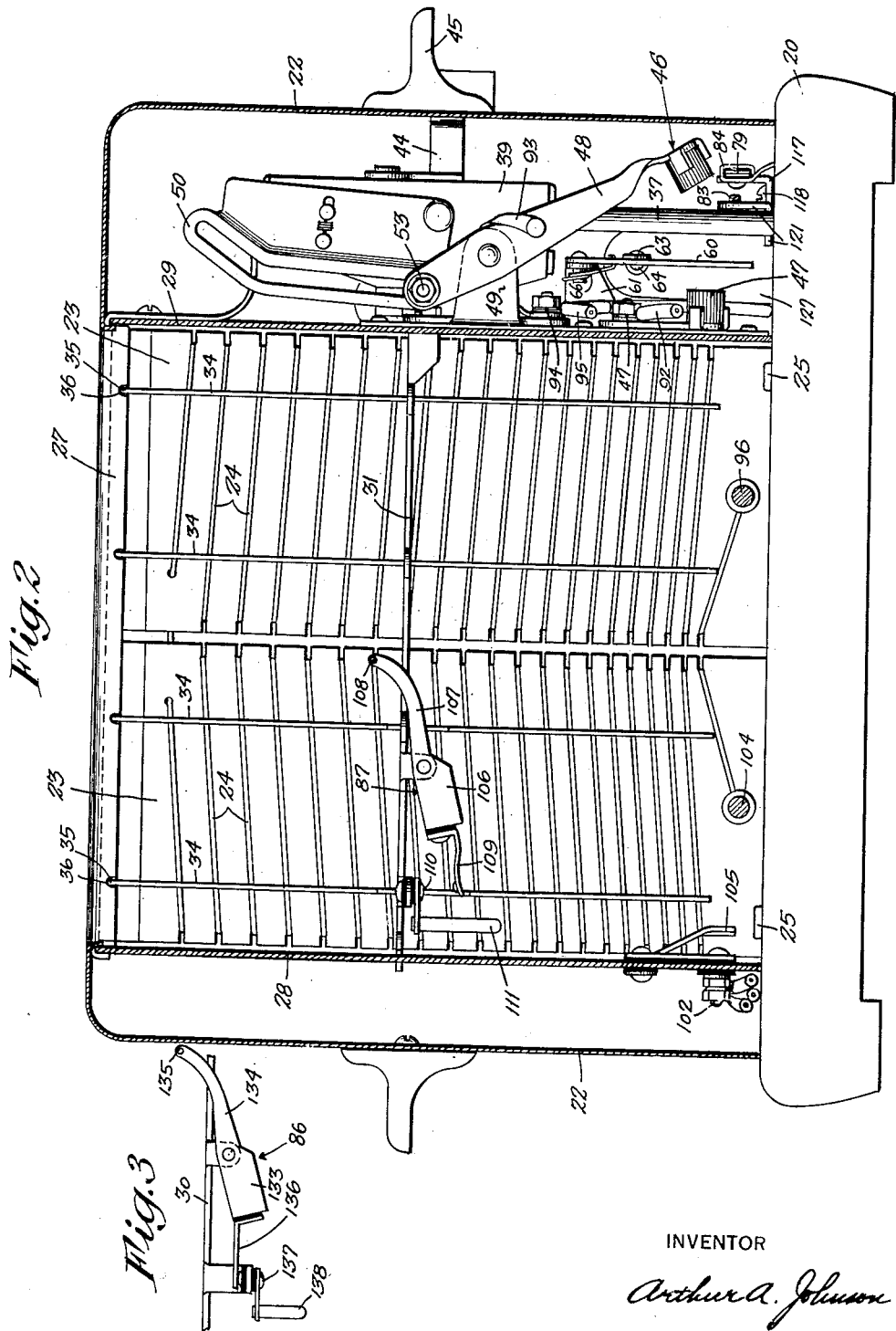

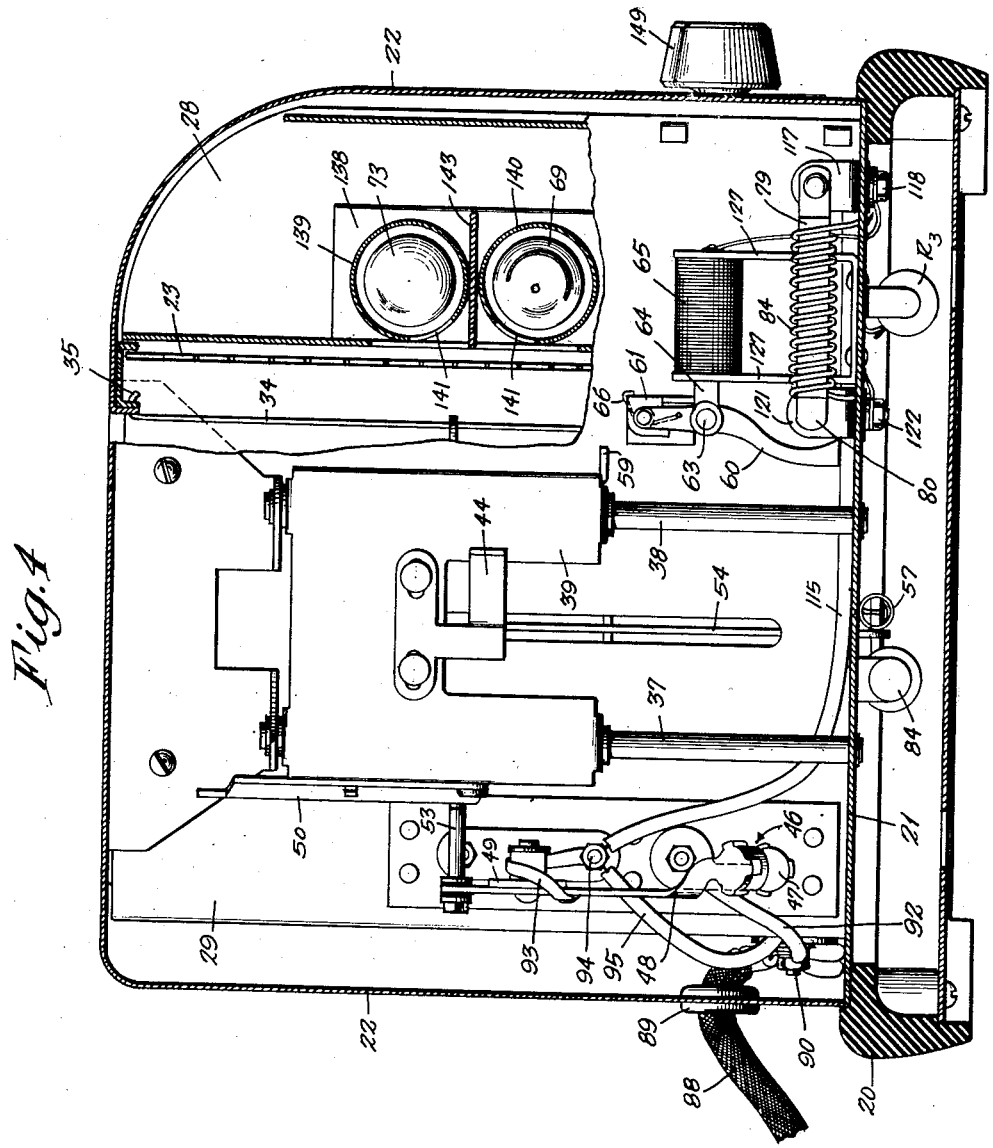

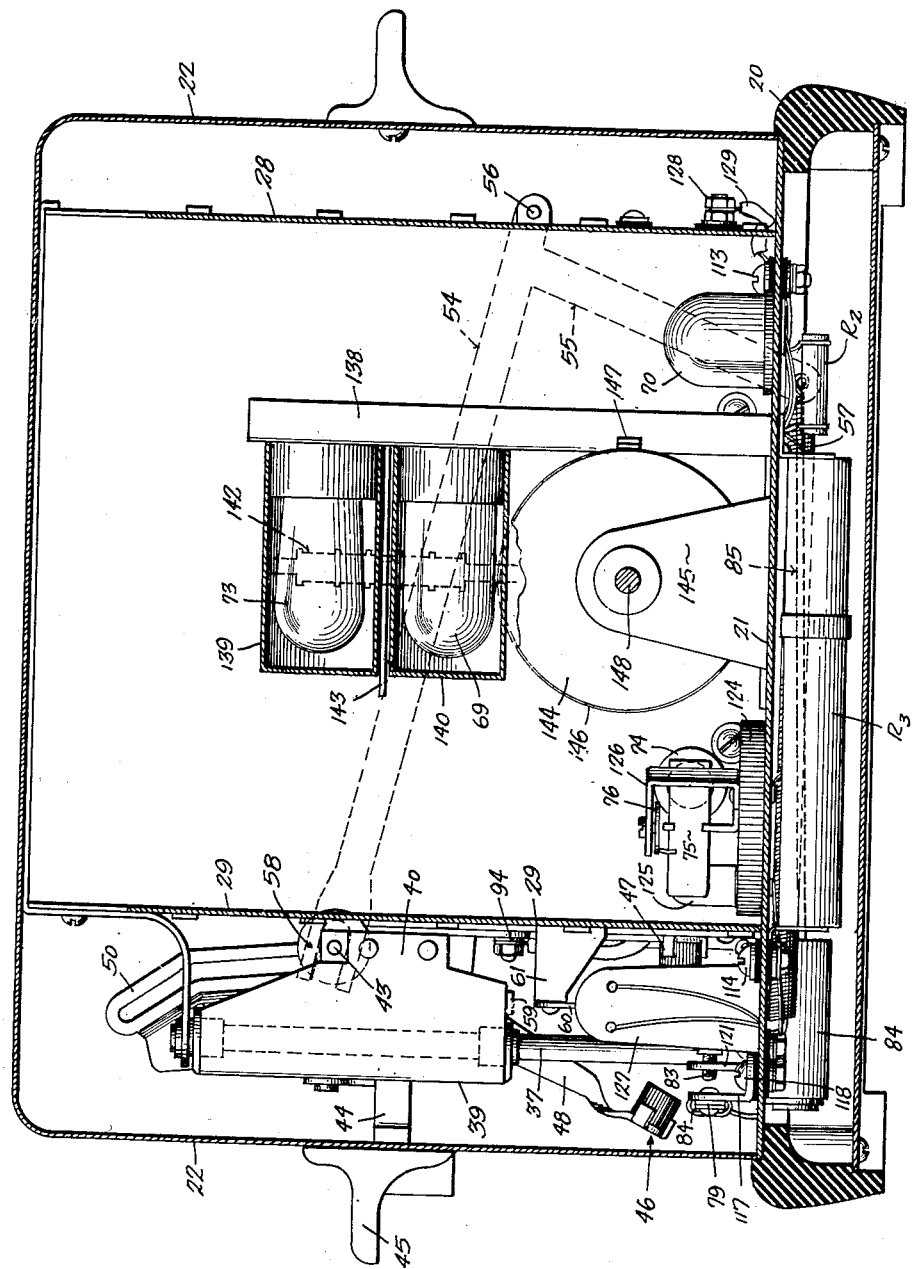

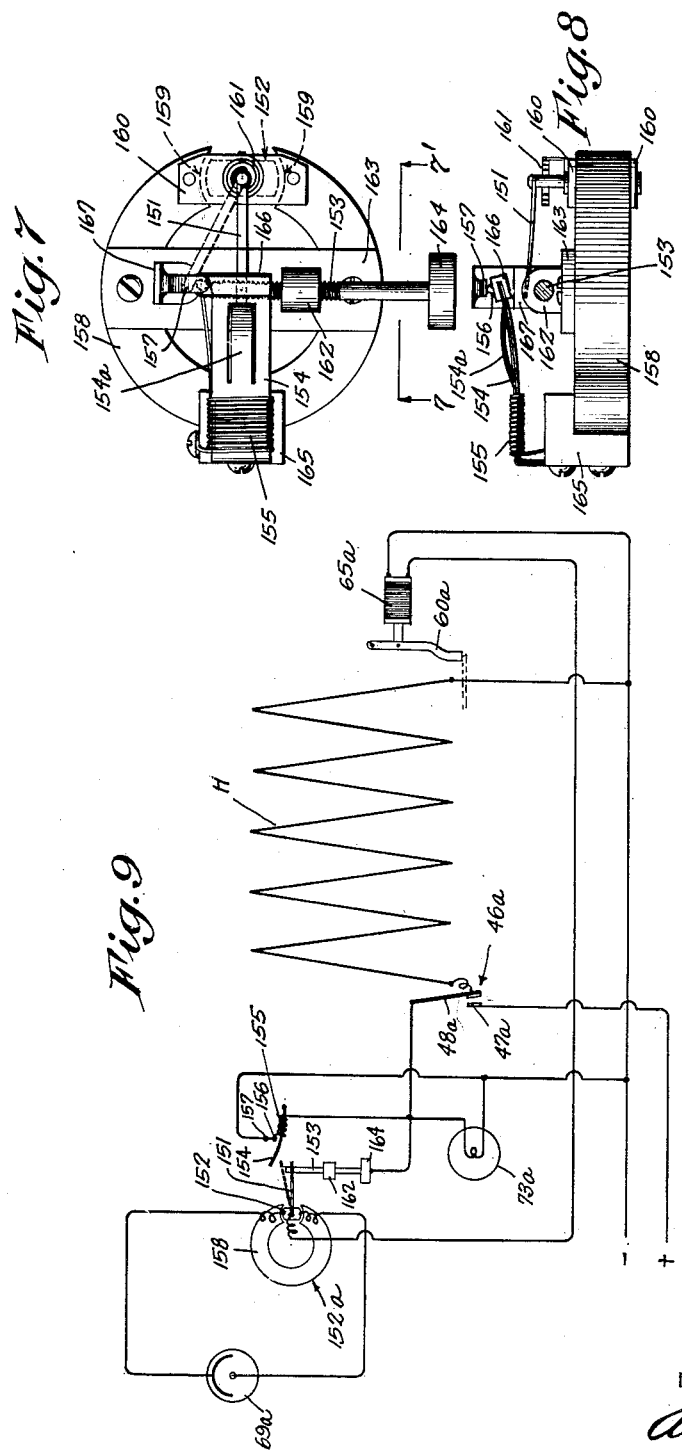

Patented Feb. 24, 1948

2,436,575

UNITED STATES PATENT OFFICE 2,436,575

AUTOMATIC TOASTER

Arthur A. Johnson, Bridgeport, Conn., assignor to Casco Products Corporation, Bridgeport, Conn., a corporation of Connecticut Application June 20, 1940, Serial No. 341,445

23 Claims. (Cl. 99—326)

This invention relates to toasters, and, more particularly, to a toaster having means for automatically discontinuing the toasting period after the bread slice has been toasted a predetermined degree.

Various forms of automatic toasters have been heretofore proposed, and these prior devices have generally consisted of either a timing mechanism to be arbitrarily set by the user of the toaster to time the duration of the toasting period, or a heat-responsive member which measured the duration of the toasting period by the degree of heat within the toaster or the temperature of the surface of the bread slice being toasted.

Many of the previously proposed toasters which employed a timing mechanism also employed a heat-responsive member for varying the actuation of the timing mechanism to compensate for the variations in temperature in the casing during successive toasting periods. Whether these prior toasters were time controlled or thermostatically controlled, the actual timing of the toasting period was never accurate and the bread slices being toasted consequently were toasted to varying degrees of color.

The toaster of the present invention is one that will unvaryingly time the toasting operation, as the duration of the toasting period is dependent upon change in surface conditions of the bread slice being toasted. The duration of the toasting period, according to the present invention, is controlled by the color of the surface of the bread slice being toasted rather than an arbitrarily set time measuring device or an energy measuring device such as a thermostat.

Slices of bread toasted by the device of the present invention are, therefore, always toasted to a predetermined degree of color irrespective of the condition of the bread prior to the initiation of the toasting period or the heat conditions within the toaster itself.

In the preferred form of the invention, a control unit is mounted within the toaster casing and is adapted to effect a control of the toasting period when the bread slice has been toasted to some predetermined degree of color. The control unit, according to the present invention, includes a light-sensitive cell responding to the change in color of the surface of the bread slice being toasted and adapted to terminate the toasting period when the bread slice has been toasted to some predetermined desired degree of brownness. This control unit, sensing the change in the color of the surface of the bread slice being toasted, is adapted to control a translating device which is normally inoperative but is made operative to eject the toast and interrupt the power supply by a predetermined change in the magnitude of the light reflected by the surface of the bread slice as said surface changes color during the toasting period.

The toaster of the present invention may have more than one toasting compartment and yet only one control unit will be necessary to control the toasting of the multiple compartments. This is accomplished in the preferred form of the invention by associating the control unit with one toasting compartment, having means which causes the translating or toast-ejecting device to be operative for all compartments, and means in said compartment rendering the other toasting compartments inoperative until a bread slice is positioned within the controlled compartment.

To increase economy of operation, the heating elements of the compartments which are not associated with the control unit are each energized only upon the insertion of a bread slice in the respective compartments.

In one embodiment of the invention the control unit, produces a current in a control circuit, the magnitude of which varies as a function of the intensity of a light beam reflected from the surface of a bread slice being toasted. The said current operates a system of relays, when it attains a predetermined value, to cause an auxiliary circuit to open a switch in the circuit of the heating elements of the toaster, and to render the translating means effective to eject the toast, thus terminating the toasting period, when the amount of light reflected from the bread slice is decreased to an extent corresponding to the desired browning of the toast.

In another embodiment of the invention, the control unit comprises a means periodically operated which tests at each periodic operation for a predetermined degree of change in the magnitude of the light reflected by the surface of the bread slice being toasted. The periodically operated means is adapted upon the attainment of the predetermined change in the magnitude of the light reflected to energize an auxiliary circuit whereby a switch in the circuit of the heating elements is opened, the translating means is rendered effective to eject the toast, and the toasting period is terminated.

In each case, the control unit comprises a photoelectric cell, and means is preferably provided to momentarily delay initial operation of the auxiliary circuit at the beginning of the toasting period to allow the photoelectric cell to attain equilibrium with the amount of light reflected thereon from the untoasted bread.

Other features and advantages will hereinafter appear.

In the accompanying drawings:

Fig. 2 is a cross-section substantially along the line 2—2' in Fig. 1 in the direction of the arrows, showing in elevation, a heating element, toast support, and switch carried thereby in a toasting compartment which is not directly controlled by a light-sensitive means.

Fig. 3 is a fragmentary detail of a switch carried by a toast support in the toasting compartment directly controlled by a light-sensitive means.

Fig. 4 is a cross-section substantially along the line 4—4' in Fig. 1, portions of the structure being cut away to show an underlying photoelectric control device.

Fig. 5 is a cross-section substantially along the line 5—5' in Fig. 1.

Fig. 7 is a plan view of a control device adapted to test intermittently for the degree of illumination of a light-sensitive means.

Fig. 8 is a side view of the control device of Fig. 7, partly in cross-section along the line 7—7'.

Fig. 9 is a wiring diagram showing the electrical relation of various elements of a control circuit including the control device of Figs. 7 and 8.

Figure 1:
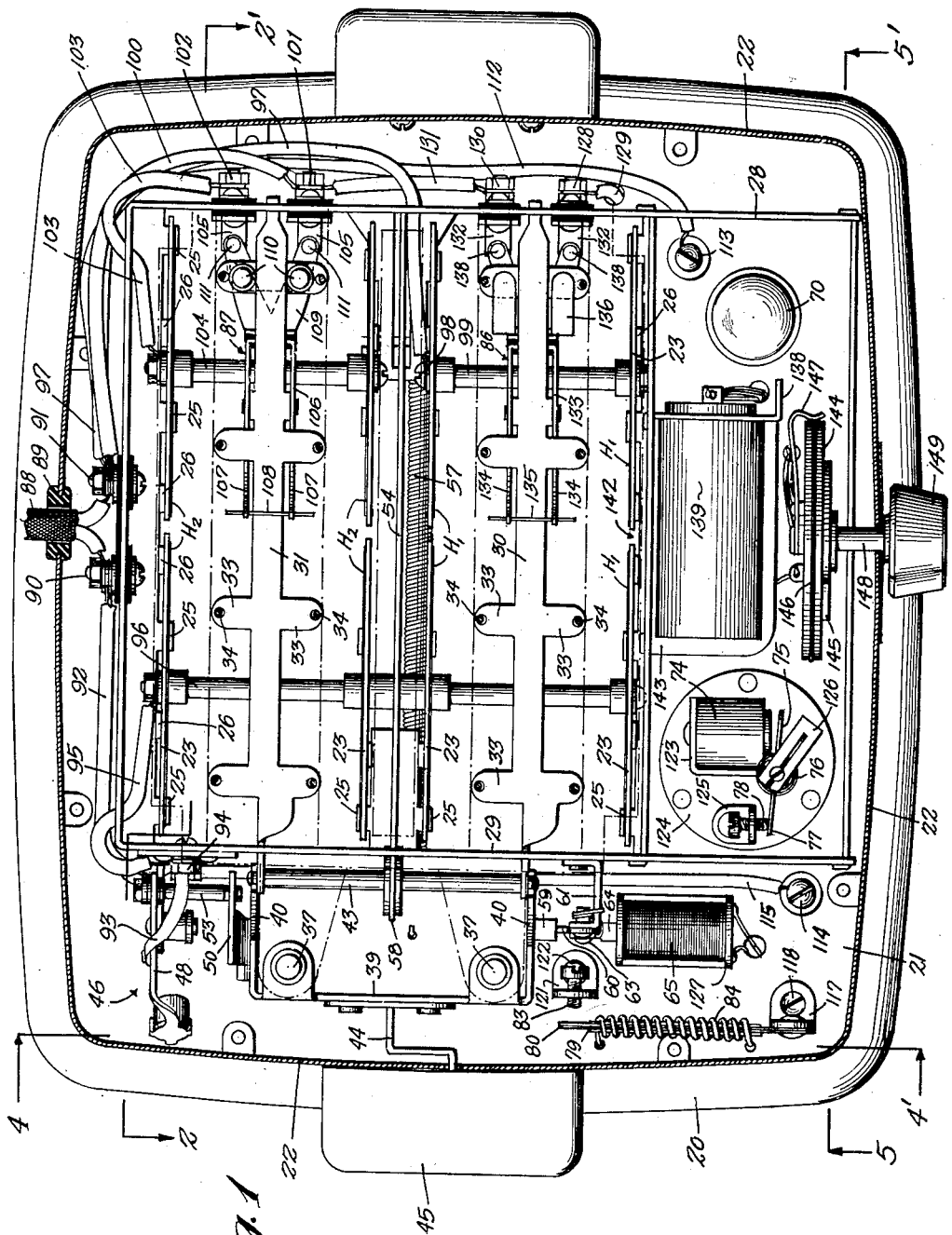
Figure 1 is a plan elevation of an electric toaster of the present invention with the upper portion of the casing cut away to show the interior thereof.

In the preferred form of the invention, a base 20, which may be formed of some moldable material, supports a base plate 21 and frame structure comprising preferably a sheet metal casing 22 secured in any desired manner to the base 20.

The casing 22 houses the toasting chamber which may include a plurality of vertically extending relatively thin sheets 23 of insulating heat-resistant material shown in the present invention as arranged in four planes so spaced as to form two toasting compartments, so that two slices of bread may be simultaneously accommodated. The sheets 23 carry electric resistor wires 24, a greater portion of which is carried by the lower half of the respective sheets in order that the heat generated thereby may be substantially uniformly distributed over the surface of a slice of bread which is to be toasted.

The lower end portion of the respective sheets 23 are preferably held in their proper operative position by upstanding tabs 25 which may be lanced out of and bent up from the plate 21. Alternate tabs 26 are slightly displaced therefrom so that the bottom edges of the sheets 23 will fit therebetween. The upper edges of the sheets 23 are preferably held by inturned flanges 27 defining slice-receiving openings at the top of the casing 22. A pair of transverse walls 28 and 29 spaced from the opposite end walls of the casing 22 form end walls for each toasting compartment.

A pair of toast or bread slice supports 30 and 31 positioned respectively in the two toasting compartments between pairs of spaced heating elements, are vertically movable in the toaster from an upper nontoasting position wherein the supported bread projects beyond the top wall of the casing 22, to a lower toasting position whereIn the bread supported lies wholly within the toasting compartment.

According to the present invention, the bread slice supports each comprises an elongate carrier disposed in each toasting compartment. Each carrier is provided with oppositely projecting lugs 33 apertured to receive a plurality of guard wires or rods 34 having suitable hooks 35 formed at their upper edges which are seated in recesses 36 formed in the flanges 27. It is understood that the wires 34 are firmly secured at their upper ends, and the lugs 33 slide up and down on the wires when the toaster is operated. The opposite ends of each carrier are movable in slots provided in the walls 28 and 29, the slots (not shown) guiding the bread carriers in their up and down movement.

To support the bread slice supports for movement within the toasting chambers, a pair of standards 37 and 38 are positioned intermediate the transverse wall 29 and the adjacent end wall of the casing 22 and support a slider 39 formed with a pair of arms 40. The free end of each of the said arms is secured to a projecting end of each bread support 30 or 31.

A rod 43 has its opposite ends connected to the projecting ends of each bread slice carrier or support, and properly spaces the projecting ends of the carriers or supports relatively to each other. An arm 44 secured to the slider 39 rides in a slot formed in the adjacent end wall of the casing and carries a knob 45 lying outside the casing. The slider 39 may be moved downwardly by an operator by pressing on the knob 45 causing the bread slice supports 30 and 31 to be also moved downwardly.

A switch 46 for controlling the energization of the heating elements preferably includes a fixed contact member 47 insulatedly supported on the wall 29 and a contact arm 48 also insulatedly mounted on the wall 29 and pivotally supported thereon by a suitable bracket 49.

According to the present invention, means are provided for causing movement of the arm 48 coincident with vertical movement of the slider 39 and includes a slotted plate 50 secured at one side of and to slider 39, the arm 48 being provided with a rod 53 having one end fitting in the slotted plate 50. To hold the switch normally in open-circuit position and the bread slice supports in their upper or nontoasting position, a bell crank lever comprising a substantially horizontally extending arm 54 and a depending arm 55 is pivotally mounted at 56 on wall 28. A helical spring 57 has one end connected to the free end of the arm 55 and has its other end secured to the base plate 21. The free end of arm 54 is slotted, as shown at 58, the rod 43 being positioned in said slotted end so that downward movement of the slider 39 and the associated parts will cause movement of the arms 54 and 55 in a counterclockwise direction as viewed in Fig. 5, accompanied by downward movement of the bread slice supports 30 and 31, and closing of the switch 46.

To hold the switch 46 closed and the bread slice supports in their lower or toasting position, a projection 59 carried by slider 39 is adapted to fit below the lower end of a latch arm 60 pivotally mounted on a bracket 61 supported on the wall 29, and pivotally attached as at 63 to an armature 64 of an electromagnet 65. The latch arm 60 is normally biased by means of spring 66 to a position wherein the lower end will lie above the projection 59 when the bread slice supports 30 and 31 are moved to the lower or toasting position.

In order to time the duration of the toasting period, a control is provided which (referring now to Fig. 6) comprises a control circuit 67 including means for sensing a predetermined change in color of the surface of the bread being toasted. The circuit 67 is controlled by the switch 46 which controls the circuit through the heating elements HI and H2, respectively associated with two toasting compartments of the toaster, and is energized simultaneously with the energization of said heating elements. The circuit includes a variable resistance 68, a photocell 69 of the resistance type and an electron discharge tube 70 having a filament, grid and plate, the filament of which is energized by the closing of the switch 46, which controls the heating elements of the toaster.

Suitable resistance units R1, R2, and R3 are included in the control circuit 67 to apply a normal negative bias to the tube 70. A source of light such as a lamp bulb 73 is suitably connected and so positioned that the light emanating therefrom will be directed onto the surface of bread being toasted by heating elements HI of one toasting compartment, and reflected back into the photocell 69. An electromagnet 74 is connected to the plate of the tube 70, which magnet, when energized, attracts an armature 75 normally biased by spring 76 to the position shown in Fig. 6, wherein a contact 77 carried by the armature 75 is held in engagement with a contact 78 of a circuit including a bimetallic arm 79 having an end 80 thereof normally displaced from a contact 83.

When the knob 45 is depressed carrying the slider 39 and its associated parts downward, the switch 46 is closed, completing a circuit through the heating elements HI of the toasting compartment associated with the lamp bulb 73 and photocell 69, and if the switch 87 is closed, through the heating element H2 of the other toasting compartment. The slider 39 is normally prevented from rising by reason of the latch arm 60 holding the projection 59. Hence, this circuit will be held closed until the latch arm 60 releases the projection 59.

The closing of the switch 46 also closes the control circuit 67 illuminating the lamp 73, the light rays of which are reflected by the surface of the bread slice to be toasted in the compartment heated by heating elements HI, onto the photocell 69. The closing of the control circuit 67 accompanied by excitation of the photocell 69 energizes the electromagnet 74, which attracts the armature 75, thus separating the contacts 77 and 78.

Closing of the switch 46 also energizes a resistance 84, wound about the bimetallic arm 79, and due to the heat generated by the resistance 84, the said arm flexes and moves its free end 80 into engagement with the contact 83. The said operation of the thermostat requires a momentary time interval after closure of the switch 46, which is sufficient to delay closure of the circuit to the contacts 77 and 78 until the latter have been separated in response to the illumination of the photoelectric cell 69.

The amount of light directed against the photocell 69 will decrease as the bread slice is toasted, and when the potential on the grid of the tube 70 becomes less positive and assumes a negative potential equal to the cutoff potential of the tube, current in the plate circuit of the tube will cease to flow. As a result, the electromagnet 74 is deenergized, and allows the spring 76 to move contact 77 into engagement with contact 78. The engagement of contacts 78 and 79 completes a circuit through the electromagnet 65 and energization of the electromagnet 65 causes armature 64 to move the latch arm 60 to a position wherein it no longer overlies the projection 59 and the spring 57 urges the bell crank lever to move in a clockwise direction causing the forked end 58 of the arm 54 to move the slider 39 upwardly. The rod 53 riding in the slot of the plate 50 will cause contact arm 48 to move away from contact 47 to open the circuit at the switch 46.

In order to prevent the return motion of the toast supports 30 and 31 from being too violent, whereby the pieces of toast might be catapulted from the toaster, a pneumatic dashpot 84 is provided on the lower surface of the base plate 21 including a cylinder containing a plunger which is connected by means of a rod 85 to the lower end of the arm 55 of the bell crank lever. As will be readily understood, the damping action of the dashpot cushions the return of the toast supports to their toast-ejecting position.

In order to render the toaster inoperative if a slice of bread is not positioned in the toasting compartment controlled by the photoelectric cell 69 and its associated lamp 73, a switch 86 is provided which is adapted to close a shunt circuit for energizing the magnet 65 whenever the toast support in the said compartment is lowered to toasting position. The said switch is adapted to be opened whenever a slice of bread is positioned in the said compartment rendering said shunt circuit inoperative, and allowing the control circuit 67 to operate the magnet 65 and its associated latch mechanism.

Thus if the knob 45 is inadvertently depressed when no bread is contained in the toaster, or if a slice of bread has been positioned in one of the compartments such as that heated by heating elements H2 which is not directly controlled by the photoelectric cell and its associated circuit, but not in the compartment controlled by the latter, the switch 86 closes the said shunt circuit to the electromagnet 65, retracting the latch arm 60, thus causing the toast supports 30 and 31 to return immediately to their toast-ejecting position and opening the control switch 46, as soon as the knob 45 is released by the operator.

It will be seen, therefore, that it is impossible to toast a bread slice in the second compartment heated by the elements H2 without first inserting a bread slice into the first compartment heated by the elements HI which is directly controlled by the photocell 69.

To prevent the energization of the heating coils H2 associated with the second compartment when no bread slice is inserted into the first compartment, a normally open switch 87 is disposed within the second compartment which prevents the energization of the heating coils H2 even though the switch 46 may be closed. The switch 87 is actuated and closed by a bread slice being inserted into the second compartment.

Figure 6:
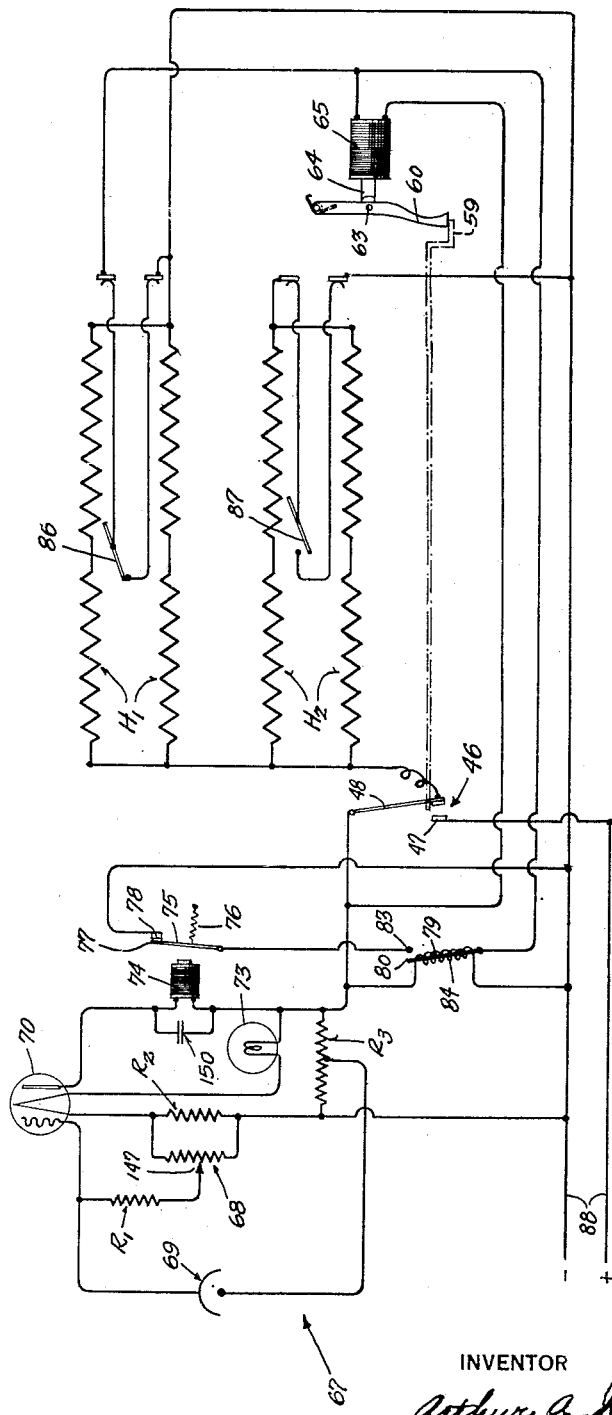
Fig. 6 is a wiring diagram showing the electrical relation of the various elements of an embodiment of the invention illustrated in Figs. 1 to 5 inclusive.

The electrical relationship between the various elements of the control circuit and heating element circuits has been described and diagrammatically shown in Fig. 6 and I illustrate in Figs. 1 to 5 inclusive, the physical relationship between the various elements thereof.

Referring now to Figs. 1 to 5, the lead 88 to the supply circuit is led through a suitable rubber bushing 89 and the ends of the twin conductors thereof are secured to conductor posts 90 and 91 respectively. A wire 92 leads from the post 90 to the contact member 47 and a wire 93 connects the arm 48 to a post 94. Post 94 is connected by a wire 95 to a conductor 96 which provides a common terminal for one end of each of the heating elements H1 and H2.

Post 91 is connected by means of a wire 97 to a terminal 98 on a conductor 99 which provides a common terminal for each of the heating elements H1. A second wire 100 from post 91 is connected to a terminal 101 insulatedly supported on the wall 28 at the bottom of the toasting compartment which is heated by the elements H2. A companion terminal 102 similarly supported on the wall 28 at the bottom of the said toasting compartment is connected by means of a wire 103 to a conductor 104 which forms a common terminal for the other ends of the said heating elements H2. The said pair of terminals are associated with a corresponding pair of spring contacts 105 on the inner side of the wall 28.

The toast support 31 in the said compartment carries the switch 87 comprising a bail member 106 pivotally supported on a pair of downwardly projecting lugs on each side of the toast support 31, the free ends of the arms 107 of the said bail member projecting upward above the level of said toast support, and carrying a transverse link 108. The opposite joined end of the said bail member carries a contactor 109 insulatedly supported thereon. The said toast support 31 also carries a pair of contacts 110 overlying the said contactor 109 and insulated from the support. The contactor 109 normally assumes a position below the said pair of contacts, but when a slice of bread is positioned in the toast compartment upon the toast carrier 31, the weight of the bread depresses the transverse link 108 raising the contactor 109 until it engages the said pair of contacts 110. The latter are provided with downwardly projecting fingers 111 adapted to engage spring contacts 105 at the lower portion of the toasting compartment. Thus when a piece of bread is positioned in the said compartment and the knob 45 is depressed lowering the toast support 31, an electrical circuit is established between the two spring contacts closing the circuit from the post 91 to the conductor 104, and energizing the heating elements H2. However, if a slice of bread is not positioned in the said compartment, the contactor 109 carried by the bail member 106 remains out of engagement with contacts 110 and the circuit to the heating elements H2 of the said compartment is not energized by lowering the toast support 31.

Post 91 is connected by a wire 112 to a terminal 113 for supplying the control circuit 67. The corresponding opposite terminal 114 for the said control circuit is connected by means of wire 115 to the post 94. The said control circuit is thus energized by the main switch 46 comprising contacts 47 and 48.

The control devices of the toaster include a bimetal strip 79 supported on a bracket 117 insulatedly secured to the base 21 of the casing 22 of the toaster by means of a terminal screw 118 which protrudes through the lower surface of said base and constitutes a terminal for said strip. The said strip is provided with a resistant winding 84, insulated therefrom for heating the said strip. The free end 80 of the bimetallic strip 79 is adapted when the heating coil 84 is energized to flex into engagement with an adjustable terminal 83 supported by a bracket 121 secured with suitable insulation to the base 21 of the casing 22 by means of a bolt 122, protruding through said base and also providing a terminal on the lower side of said base. The end 80 of the bimetal strip 79 remains out of engagement with the said adjustable contact 83 when the heating coil 84 is not energized.

Another element in the control mechanism comprises the magnet 74 suitably supported by a bracket 123 attached to an insulating disk 124 which is secured to the base 21 of the casing 22. An adjustable contact 78 is supported on the said disk by a second bracket 125 which is provided with a conducting terminal projecting through the base 21 of the toaster. A U-shaped yoke 126 likewise supported on the said insulating disk and having a similar conducting terminal protruding through the base of the toaster supports the armature 75 in a pivotal manner, one end of which constitutes the contactor 77, the said armature being normally biased by the spring 76 to cause contactor 77 to engage the end of the adjustable contact 78. The opposite end of the said armature is attracted by the magnet 74, when the latter is energized, to disengage the said contactor 77 from the said adjustable contact 78.

A third element of a control mechanism is constituted by the electromagnet 65 hereinbefore described, the armature 64 of which controls the latch 60. The latter electromagnet is supported by a U-shaped yoke 127 attached to the base of the toaster.

One of the leads from the windings of the electromagnet 65 is connected to the terminal 114. The other lead from the said electromagnet is attached to the fixed terminal 118 of the bimetal strip 79. The adjustable terminal 83, adapted to be contacted by the end 80 of said bimetal strip is connected through the yoke 126 to the armature 75 of the electromagnet 74, while the adjustable contact 78 of the latter is attached to the terminal 113 which is directly connected to the post 91.

One end of the heating coil 84 on the bimetal strip 79 is connected to the terminal 114 while the other end of the said heating coil is connected to terminal 113, for instance, by a lead attached to the adjustable contact 78 of the electromagnet 74.

It will be observed that the heating coil 84 of the bimetal strip 79 is energized as soon as the knob 45 is depressed, establishing a contact between the elements 47 and 48 of the switch 46. Initially, the circuit to the windings of the electromagnet 65 is open between the free end 80 of the bimetal strip 79 and the adjustable contact 83 associated therewith, while the said circuit is initially closed between the adjustable contact 78 and movable contactor 77 of the photo-responsive electromagnet 74. However, as soon as the photoelectric cell 69 is energized by the illumination reflected from untoasted bread positioned in the toasting compartment, the electromagnet 74 opens the circuit of the windings of electromagnet 65 by attracting the opposite end of the pivotally supported armature 75 thereby disengaging contacts 77 and 78. Immediately thereafter, the bimetallic strip 79 closes the circuit to the said contactor 77 by engaging adjustable contact 83. When the excitation of the photoelectric cell 69 has decreased as a result of the darkening of the bread in the adjacent toasting compartment, the photo-responsive electromagnet 74 becomes deenergized, allowing the contact 77 on pivoted armature 75 to engage adjustable contact 78, and energize the windings of electromagnet 65. The latch mechanism is operated thereby to release the toast supports 30 and 31 so that they are projected upward by means of the spring 57, simultaneously opening the switch 46.

Means provided to render the toaster inoperative when no bread is positioned in the toasting compartment adjacent the photoelectric cell 69 comprises a shunt circuit adapted to energize the windings of the electromagnet 65 whereby the latch 60 is released and the toast supports cannot be retained in toasting position. This shunt circuit is formed by connecting the second lead of the electromagnet 65 to a terminal 128 insulatedly supported on the wall 28 adjacent the bottom of the photo-controlled toasting compartment, the other lead being attached as hereinbefore stated to terminal 114. This connection may be provided, for instance, by a wire 129 joining the fixed terminal 118 of the bimetallic strip 79 with the said terminal 128 on the wall 28. A companion terminal 130 similarly supported on the said wall is connected with post 91, for instance, by a wire 131 joining the latter terminal with the terminal 101.

The pair of terminals 128 and 130 are provided with a pair of spring contacts 132 on the inner side of the wall 28, similar to the spring contacts 105 carried by the terminals 101 and 102 hereinbefore described. The switch 86, shown in Fig. 3, adapted to establish contact between the said terminals, comprises a bail member 133 similar to the bail member 106 hereinbefore described, pivotally supported on downward projecting lugs on either side of the toast support 30. The free ends of the arms 134 of said bail member extend above the level of said support and are joined by a transverse link 135. The opposite end of the said bail member carries a contactor 136 normally establishing a connection between a pair of contacts 137, carried by the said toast support, positioned below the said contactor. The latter contacts 137 are each provided with a downwardly extending finger 138 adapted to engage spring contacts 132 respectively when the toast support 30 is lowered to toasting position by depressing the knob 45.

When a piece of bread is positioned in the said compartment, it rests upon the transverse link 135 raising contactor 136 out of engagement with contacts 137. Thus when a piece of bread is positioned on the said toast support 30, the shunt circuit to the winding of the magnet 65 is maintained open, and the said magnet and the associated latch mechanism is operated solely by the photo-responsive control circuit 67. However, if no bread is supported by the said toast carrier, the shunt circuit is established, as soon as the said carrier is lowered to toasting position by depressing knob 45, through the switch 86 to the aforesaid electromagnet 65, causing the latch mechanism to release the toast supports 30 and 31 and bringing them immediately to toast-ejecting position when knob 45 is released.

The control circuit 67 includes a vacuum tube 70 of the well-known type containing a filament, plate, and grid, said tube being carried by a socket in the base 21 of the toaster.

Lamp 73 and photoelectric cell 69 are supported one above the other by a bracket 138 affixed to the base 21 of the casing 22, adjacent the toasting compartment heated by the elements H1. The said lamp and cell are housed in a pair of opaque shields 139 and 140, each having an aperture 141 so disposed that the light from the lamp 73 traverses a slot 142 in the adjacent plate 23 to illuminate a piece of bread in the toasting compartment heated by the elements H1 and is reflected thereby back into the photoelectric cell 69. An opaque baffle 143 prevents direct transmission of the light from the lamp to the photo cell.

Fixed resistances R2 and R3 are fastened to the lower surface of the base 21 of the toaster while fixed resistance R1 and variable resistance 68 are carried by a disk member 144 which is supported on a bracket 145 attached to the base 21 of the toaster. Variable resistance 68 comprises a resistor 146 extending around the periphery of the said disk, and a contactor 147 adapted to engage said resistor, carried by a rotary shaft 148 journaled in the said bracket. A knob 149 carried by said shaft, disposed on the outside of the toaster is provided for manually adjusting the position of said contactor.

The relation of the elements of the control circuit 67 may be best seen from the wiring diagram in Fig. 6. The said circuit is preferably adapted for use with 110 volt 60 cycle alternating current. For this purpose, the photoelectric cell 69 is of the resistance type, illumination of the cell causing a decrease in the resistance thereof to the passage of small electric currents. The filament of the vacuum tube 70 and of the lamp 73 are connected in series with the fixed resistance R2 of 100 ohms. The plate circuit of the lamp includes the windings of the photoresponsive electromagnet 74. These windings are shunted by a condensor 150 having a capacity of 0.5 microfarad in order to prevent chattering. The resistance 68 of 400 ohms, that is, the resistor 146 carried by the disk 144, is connected in parallel with the fixed resistance R2 in the filament circuit. The movable contactor 147 is connected through a fixed resistance R1 of 5 megohms to the grid of the vacuum tube 70. The said grid is also connected through the photoelectric cell 69 to an intermediate point on a high resistance R3 of 10,000 ohms connecting the filament circuit with the plate circuit, the resistance between the said intermediate point and the filament being 6 000 ohms while the resistance between the intermediate point and the plate circuit is 4,000 ohms.

When the photoelectric cell 69 is not excited, its resistance is relatively high, and under these conditions the grid is negatively biased with reference to the filament so no current flows in the plate circuit. The photo-responsive magnet 74 is thus not energized, allowing the armature 75 of the said magnet to maintain the circuit of the latch operating electromagnet 65 closed. However, when the photoelectric cell 69 is excited by illumination reflected, for instance, from the surface of a piece of untoasted bread in the adjacent toaster compartment, the grid is positively biased in such a manner as to permit flow of current in the plate circuit of the vacuum tube, thus energizing the photo-responsive electromagnet 74, which attracts the armature 75, and interrupts the circuit through the latch-operating electromagnet 65. As the toast darkens, resistance of the cell 69 increases, causing the grid to become increasingly negative until the cutoff potential of the vacuum tube, is reached, once more deenergizing magnet 74, closing the circuit to the electromagnet 65, and terminating the toasting operation.

By varying the position of the movable contactor 147 on the 400 ohm resistor 68, the intensity of illumination of the photoelectric cell 69 at which the flow of current in the plate circuit is interrupted and the circuit to the electromagnet 65 is reestablished, may be varied. Thus by adjusting the knob 149 on the exterior of the toaster, the degree of brownness of the toast at which it will be ejected may be controlled.

A different form of control circuit is shown in Figs. 7, 8 and 9. Referring to Fig. 9 which shows a wiring diagram of the latter control circuit, the heating elements H of the toaster are connected through a switch 46a comprising contactor 47a and arm 48a to the power supply. Electromagnet 65a operates latch arm 60a for releasing the toast supports 30 and 31, and for opening the said switch 46a when the said magnet 65a is energized. One terminal of the windings of said magnet is attached to the line, and the other terminal is connected to a contact finger 151 carried by the movable armature 152 of a D'Arsonval instrument 152a. The said contact finger is adapted to move over an adjustable contact 153 which is connected to the contact arm 48a of the switch 46a.

A bimetallic finger 154 is positioned above the said contact finger 151 and is adapted when heated to depress the latter, causing it to engage the adjustable contact 153. The bimetallic finger 154 carries a heating coil 155, one end of which is connected to a terminal 156 insulatedly carried by the free end of the bimetal finger, the other end being connected to the contact arm 48a of the switch 46a. The said terminal 156 is adapted when the bimetal is not heated to engage a fixed contact 157 which is connected with the line. Thus when the switch 46a is closed, the heating coil 155 is energized, causing the bimetallic finger 154 to flex downward, depressing contact finger 151 until it engages the adjustable contact 153, and at the same time interrupting the circuit through the heating coil 155 by separating contacts 156 and 157. As the bimetallic member cools, it returns to its original position releasing contact finger 151, but reenergizing the heating coil 155. Thus, as long as the switch 46a is closed, operation of the bimetallic member is intermittent, each flexure thereof testing the position of the finger 151. When the armature coil of the D'Arsonval instrument 152 is sufficiently energized, the contact finger 151 is displaced from above the adjustable contact 153 and the circuit through the electromagnet 65a remains open, even though the bimetallic member 154 is operated. However, as energization of the said armature coil decreases, the said finger 151 moves back above said adjustable contact 153 and subsequent operation of the bimetallic finger energizes the coils of the electromagnet 65a releasing the latch mechanism, allowing the toast supports 30 and 31 to be raised, and opening the main switch 46a.

The position of the contact finger 151 is controlled by a photoelectric cell 69a of the emission type, that is, a cell adapted to produce a small current of increasing intensity as illumination thereof increases.

An electric lamp 73a controlled by the switch 46a is provided to illuminate the surface of a piece of bread being toasted by the heating element H, the light reflected from said surface illuminating the photoelectric cell 69a.

Photoelectric cell 69a is connected in the circuit of the armature windings of the D'Arsonval instrument 152. The contact finger 151 is so positioned on said armature that it overlies the adjustable contactor 153 when the photoelectric cell is not illuminated, and is moved away from the said position when the cell is relatively brightly illuminated as for instance by light reflected from a piece of untoasted bread positioned in a toasting compartment of the toaster. The momentary time interval required for initial flexure of the bimetallic strip 154 after closure of the switch 46a is sufficient to allow the photoelectric cell to move finger 151 beyond the end of contact 153. By adjusting contact 153, the decrease in illumination of the photoelectric cell at which finger 151 attains a position above the tip of contact 153 and just reestablishes the circuit to the electromagnet 65a, controlling the latch mechanism may be varied at will.

Thus, the latter control arrangement may be substituted for the control circuit 67 hereinbefore described to operate the toaster in a similar manner, causing the toaster to eject the toast, and open the power switch when the toast has attained the desired degree of brownness.

An illustrative physical embodiment of the last-described control device is shown in Figs. 8 and 9, and comprises a permanent magnet 158 having adjacent concave arcuate pole faces 159. An armature 152 is pivotally supported between the pole faces 159 by a pair of brackets 160 bridging the interpolar gap. The said armature 152 carries a coil, the terminals of which are adapted to be connected to external conductors without interfering with the free rotation of the armature. A spring 161 urges the armature toward a position such that the coil thereof includes a minimum number of lines of force of the field of the permanent magnet 158.

The contact finger 151, carried by the armature 152, normally extends over an adjustable contact 153 comprising a threaded rod carried by a correspondingly threaded boss 162 attached to an insulating plate 163 affixed to the magnet 158, the said rod having a knob 164 on its external end for manual adjustment. When the armature coil is energized, the contact finger 151 is adapted to swing beyond the end of the adjustable contact 153, the requisite energization of said coil being determined by the adjustment of the latter contact.

The bimetallic finger 154 which is supported at one end on an insulating block 165 affixed to the permanent magnet 158, normally extends above the contact finger 151 and adjustable contact 153. A heating coil 155 carried by said bimetallic finger is adapted upon energization to cause the latter to flex downward, depressing the contact finger 151 and causing it to engage the adjustable contact 153, if it has not moved beyond the end thereof. An insulating tip 166 on the free end of the bimetallic finger 154 prevents electric contact between the said finger and the contact finger 151.

The said bimetallic strip 154 is adapted to snap back and forth upon heating and cooling by the provision of an oppositely flexed portion 154a, and operates periodically by virtue of a contactor 156 carried by the upper surface of the insulating tip 166, which completes a circuit through the heating coil 155 by engaging a fixed contact 157 carried by a bracket 167 attached to the insulating plate 163, when the bimetal 154 is in upwardly flexed position. As the finger 154 is heated, it snaps downward interrupting the heating circuit, and upon subsequent cooling snaps back to circuit-closing position.

Application of the control mechanism of Figs. 7 and 8 for controlling operation of the toaster of Figs. 1 to 5 inclusive will be apparent from the wiring diagram of Fig. 9, hereinbefore described. The said control mechanism replaces vacuum tube 70 with its associated resistances, and electromagnet 74 and bimetallic finger 79 with their associated circuits and mechanism; lamp 73a replaces lamp 73, and photoelectric cell 69a of the ignition type replaces cell 69 of the resistance type. For purposes of adjustment, knob 164, like knob 149, is disposed outside the casing 22 of the toaster whereby it is accessible for purposes of adjustment.

Variations and modifications may be made within the scope of this invention and portions of the improvements may be used without others.

I claim:

1. A bread toasting device comprising heating elements; a supply circuit therefor including a normally open switch; switch actuating means including a bread slice carriage normally biased to a toast-ejecting switch-opening position; latch means for holding said carriage depressed and said switch closed; electro-responsive means for releasing said latch; an auxiliary circuit including said electro-responsive means; means including a photoelectric cell responsive to the color of the bread and a sensitive relay operated thereby for abruptly altering the energization of said auxiliary circuit and causing said electro-responsive means to release said latch when the bread attains a predetermined color; and automatic delay action means for delaying operation of said electro-responsive latch-releasing means until said cell becomes operative to control said auxiliary circuit.

2. A bread toasting device comprising a heating element; a supply circuit therefor including a normally open switch; switch-actuating means including a bread slice carriage normally biased to a toast-ejecting switch-opening position; latch means for holding said carriage depressed and said switch closed; electro-responsive means for releasing said latch; an auxiliary circuit including said electro-responsive means; means for periodically closing said auxiliary circuit; and means responsive to the color of the bread for completing said auxiliary circuit, and energizing said electro-responsive means to release said latch when the bread attains a predetermined color, said color-responsive means including a photoelectric cell responsive to the color of the bread, said periodically operated circuit-closing means initially retaining said auxiliary circuit open until said cell becomes operative to control said auxiliary circuit.

3. A bread toasting device comprising heating elements; a supply circuit therefor, including a normally open switch; switch actuating means including a bread slice carriage normally biased to a toast-ejecting switch-opening position; latch means for holding said carriage depressed in a toasting position and said switch closed; electromagnetic means for releasing said latch means upon energization, when the bread has been toasted to a predetermined degree of color; a circuit including said electro-magnetic means; a normally open switch in said circuit; a relay controlling said switch; a photoelectric cell responsive to the color of the bread, and a circuit controlled thereby, said circuit including said relay, and said photoelectric cells actuating said relay to close said switch when the bread has been toasted to a predetermined color; and an automatic delay action means for initially maintaining the circuit of the electro-magnetic means inoperative to effect release of said latch means until said cell becomes operative to control the same.

4. A bread toasting device comprising heating elements; a supply circuit therefor including a normally open switch; switch-actuating means including a bread slice carriage normally biased to a toast-ejecting switch-opening position; an auxiliary circuit including an electro-magnetic latch means for holding said carriage depressed and said switch closed; means including a photoelectric cell responsive to the color of the bread for abruptly altering the energization of said circuit, thereby causing said latch means to release said carriage when the bread attains a predetermined color; and a time controlled delay action device for initially maintaining said auxiliary circuit inoperative to effect release of said latch means until said cell becomes operative to control said circuit.

5. A bread toasting device comprising heating elements; a supply circuit therefor, including a normally open switch; switch actuating means including a bread slice carriage normally biased to a toast-ejecting switch-opening position; latch means for holding said carriage depressed in a toasting position and said switch closed; means for releasing said latch means when the bread has been toasted to a predetermined degree of color, said means comprising electro-magnetic means operating said latch means, a photoelectric cell responsive to the color of the bread, an electron discharge device for amplifying the effect of said photoelectric cell, said effect controlling the energization of a relay, a switch operated by said relay, and a circuit including said switch and said electro-magnetic means; and a delay action means for rendering the last-named circuit inoperative to effect release of said latch means until said cell and discharge device become operative to control the same, said delay action means including a normally open thermo-responsive switch and a heater therefor, said heater being energized upon closure of the supply circuit switch, and said thermo-responsive switch closing in response to the heating of said heater.

6. A bread toasting device comprising heating elements; a supply circuit therefor including a normally open switch; switch actuating means including a bread slice carriage normally biased to a toast-ejecting switch-opening position; latch means for holding said carriage depressed in toasting position and said switch closed; means for releasing said latch means when the bread has been toasted to a predetermined degree of color, said means comprising electro-magnetic means for releasing said latch means upon energization of the electro-magnet, a circuit including said electro-magnetic means, and also including a circuit-closing member freely movable over a range having operative and inoperative portions; a photoelectric cell responsive to the color of the bread for controlling the position of said movable member within said range; and a periodically operated thermo-responsive member for periodically causing said circuit-closing member to close said circuit when positioned within the operative portion of said range, initial operation of the thermo-responsive member being sufficiently delayed to retain said circuit-closing member inoperative until said cell becomes operative to control the position thereof.

7. A bread toasting device comprising heating elements; a supply circuit therefor including a normally open switch; switch actuating means including a bread slice carriage normally biased to a toast-ejecting switch-opening position; latch means for holding said carriage depressed and said switch closed; an electromagnet, the armature of which is operatively connected to said latch means and adapted upon energization to release said latch means; a normally open auxiliary circuit likewise controlled by said switch, including the windings of said electromagnet; means including a photoelectric cell for closing said auxiliary circuit and energizing said electromagnet when the article being toasted attains a predetermined color; and delay action means including a thermostat and heater therefor for retaining the auxiliary circuit open until said cell and discharge device become operative to control said circuit.

8. A bread toaster comprising in combination, a casing having a plurality of compartments for bread slices to be toasted; heating elements therein; a supply circuit for said elements including a normally open master switch; means for closing said switch including means for holding said switch in closed position; means associated with one compartment responsive to the color of the bread in that compartment for releasing said holding means when the bread has been toasted to a desired degree of brownness; and means for rendering said holding means inoperative when the compartment associated with said color-responsive means is empty, but permitting operation of said holding means under the influence of the weight of a bread slice inserted in said compartment.

9. A bread toasting device comprising a plurality of compartments for bread slices to be toasted; individual heating elements associated with said compartments; means, including a master switch, for connecting said heating elements to a source of current; means, responsive to the color of bread, associated with one of said compartments for controlling the toasting period and adapted to open the master switch and disconnect the heating elements from said source of current when the bread has been toasted to a desired degree of brownness; auxiliary switch means disposed in each of the remainder of said compartments for rendering the respective heating elements thereof inoperative when the respective compartments are empty, but rendering said heating elements operative by the insertion of a bread slice in said compartments respectively; and auxiliary switch means disposed in said controlled compartment for disconnecting all of said heating elements from the source of current when the latter compartment is empty.

10. A bread toaster comprising in combination a casing; a plurality of bread slice receiving compartments; individual heating elements associated with each compartment; a supply circuit therefor including a normally open master switch; means for closing said switch including means for holding the same closed; light controlled means associated with one compartment for releasing said holding means when the bread has been toasted to a desired degree of brownness; means for rendering said holding means inoperative when the compartment associated with said light controlled means is empty, said means adapted to be rendered inoperative by insertion of a bread slice in said controlled compartment; and auxiliary switch means in the remainder of said compartments for rendering the individual heating elements thereof normally inoperative, said means responding to the weight of bread slices inserted into the remainder of said compartments for rendering the said individual heating elements operative.

11. A bread toasting device comprising a heating element; a supply circuit therefor, including a normally open switch; switch actuating means including a bread slice carriage normally biased to a toast-ejecting switch-opening position; latch means for holding said carriage depressed in a toasting position and said switch closed; means for releasing said latch means when the bread has been toasted to a predetermined degree of color, said means comprising electro-magnetic means adapted upon energization to release said latch means; a photoelectric cell responsive to the color of the bread, an electron discharge device for amplifying the current produced by the cell, and a circuit controlled thereby, said circuit including an electro-responsive means adapted to place said electro-magnetic means in an energizing circuit when the bread has been toasted to a predetermined color; and a time controlled delay action means for holding said last-named circuit open until said cell and discharge device become operative to control said circuit.

12. A bread toasting device comprising a plurality of compartments for bread slices to be toasted therein; individual heating elements associated with each of said compartments; a supply circuit therefor including a normally open master switch; switch actuating means including bread slice carriages in each of said compartments normally biased to a toast-ejecting switch-opening position; latch means for holding said carriages depressed in a toasting position and said switch closed; means for releasing said latch means including an electromagnet; light-sensitive means associated with one of said compartments, including a photoelectric cell responsive to the color of the bread in said compartment, and a circuit controlled thereby for energizing said electro-magnetic means to release said latch when a slice of bread in the said compartment attains a predetermined color; a circuit shunting said photo-controlled circuit, for energizing said electro-magnetic means to release the latch when said photo-controlled compartment is empty; an auxiliary switch in the latter compartment for interrupting said shunt circuit upon insertion of a slice of bread therein; and auxiliary switch means in the remainder of said compartments for rendering the individual heating elements thereof normally inoperative, said auxiliary switch means responding to the weight of bread slices inserted into said remaining compartments for rendering the individual heating elements thereof operative.

13. A bread toasting device comprising a heating element; a circuit therefor, including a normally open switch; switch-actuating means including a bread slice carriage normally biased to a toast-ejecting switch-opening position; latch means for holding said carriage in toasting position and said switch closed; means for releasing said latch means when the bread has been toasted to a predetermined degree of color, said means comprising an electromagnet for releasing said latch means upon energization of its magnet coils; a circuit for energizing said electromagnet; circuit-closing means included in the latter circuit comprising a contact and a movable circuit-closing member, the latter being freely deflectable over an operative range in which it is adapted to engage said contact and an inoperative range in which it is not adapted to engage said contact; a galvanometer device having a coil for controlling the position of said circuit-closing member; a photoelectric cell responsive to the color of the bread and controlling said galvanometer device, the latter moving the deflectable circuit-closing member through the transition point from its inoperative to its operative range as the bread attains the desired toasted color; and periodically operated circuit-closing means for periodically engaging the deflectable circuit-closing member with said contact as long as the former is within its operative range, whereby upon initial closure of the circuit to the electromagnet, the said latch is released and the toast ejected.

14. A bread toasting device comprising a heating element; a circuit therefor, including a normally open switch; switch-actuating means including a bread slice carriage normally biased to a toast-ejecting switch-opening position; latch means for holding said carriage in toasting position and said switch closed; means for releasing said latch means when the bread has been toasted to a predetermined degree of color, said means comprising an electromagnet for releasing said latch means upon energization of its magnet coils; a circuit for energizing said electromagnet; circuit-closing means included in the latter circuit comprising a contact and a movable circuit-closing member, the latter being freely deflectable over an operative range in which it is adapted to engage said contact and an inoperative range in which it is not adapted to engage said contact; a galvanometer device having a coil for controlling the position of said circuit-closing member; a photoelectric cell responsive to the color of the bread and connected to said galvanometer device, the latter moving the deflectable circuit-closing member through the transition point from its inoperative to its operative range as the bread attains the desired toasted color; and periodically operated circuit-closing means comprising a bimetallic member flexing upon heating to move said deflectable member while in its operative range into a position engaging said contact to close the circuit to said electromagnet; and a heater for the bimetal, said heater being energized only as long as the bimetallic member is not flexed and deenergized upon occurrence of said flexure.

15. A bread toasting device comprising a heating element; a circuit therefor, including a normally open switch; switch-actuating means including a bread slice carriage normally biased to a toast-ejecting switch-opening position; latch means for holding said carriage in toasting position and said switch closed; means for releasing said latch means when the bread has been toasted to a predetermined degree of color, said means comprising an electromagnet for releasing said latch means upon energization of its magnet coils; a circuit for energizing said electromagnet; circuit-closing means included in the latter circuit comprising a contact and a movable circuit-closing member, the latter being freely deflectable over an operative range in which it is adapted to engage said contact and an inoperative range in which it is not adapted to engage said contact; a galvanometer device having a coil for controlling the position of said circuit-closing member; a photoelectric cell responsive to the color of the bread and controlling said galvanometer device, the latter moving the deflectable circuit-closing member through the transition point from its inoperative to its operative range as the bread attains the desired toasted color; periodically operated circuit-closing means for periodically engaging the deflectable circuit-closing member with said contact as long as the former is within its operative range, whereby upon initial closure of the circuit to the electro-magnet, the said latch is released and the toast ejected; and means for adjusting the relative position of said contact and said deflectable member for varying the color of the toast at which initial engagement of said contact and deflectable member is adapted to occur.

16. A bread toasting device comprising a heating element; a circuit therefor including a normally open switch; switch-actuating means normally biased to open-circuit position; latch means for holding said switch closed; electroresponsive means for releasing said latch upon energization thereof; an auxiliary circuit including said electroresponsive means; means for periodically closing said auxiliary circuit; and means responsive to the color of the bread for completing said auxiliary circuit and energizing said electroresponsive means to release said latch when the bread attains a predetermined color, said color-responsive means including a photoelectric cell responsive to the color of the bread, and said periodically operated circuit-closing means initially retaining said auxiliary circuit open until said cell becomes operative to control said auxiliary circuit.

17. A bread toasting device comprising a heating element; a bread slice carriage normally biased to toast-ejecting position; latch means for holding said carriage depressed; electroresponsive means for releasing said latch upon energization thereof; an auxiliary circuit including said electroresponsive means; means for periodically closing said auxiliary circuit; and means responsive to the color of the bread for completing said auxiliary circuit and energizing said electroresponsive means to release said latch when the bread attains a predetermined color, said color-responsive means including a photoelectric cell responsive to the color of the bread, and said periodically operated circuit-closing means initially retaining said auxiliary circuit open until said cell becomes operative to control said auxiliary circuit.

18. A bread toasting device comprising a heating element; a circuit therefor including a normally open switch; switch-actuating means normally biased to open-circuit position; means including electromagnetic means for holding said switch closed; means for releasing said holding means when the bread has been toasted to a predetermined degree of color, said releasing means comprising a photoelectric cell responsive to the color of the bread being toasted; a circuit controlled thereby, said circuit including said electromagnetic means, the energization of said circuit being abruptly altered in response to the change in excitation of said photoelectric cell when the bread attains a predetermined color and automatically operative, delay-acting means for delaying the operation of said releasing means until the photoelectric cell has had time to become operative.

19. A bread toasting device comprising a heating element; a circuit for said element including a normally open switch; switch-actuating means including a bread slice carriage normally biased to toast-ejecting switch-opening position; latch means for holding said carriage depressed and said switch closed; electroresponsive means for releasing said latch; an auxiliary circuit including said electroresponsive means; means for abruptly altering the energization of said auxiliary circuit for causing said electroresponsive means to release said latch when the bread attains a predetermined color, said altering means including a light-sensitive means responsive to the color of the bread being toasted, relay means controlled by said light-sensitive means and controlling a switch in said auxiliary circuit; and means for adjusting said relay means to select the color of the bread at which the release of said latch occurs.

20. A bread toasting device comprising a heating element; a circuit therefor including a normally open switch; switch-actuating means including a bread slice carriage normally biased to toast-ejecting switch-opening position; latch means for holding said carriage depressed in toasting position, and said switch closed; means for releasing said latch means when the bread has been toasted to a predetermined degree of color, said means comprising electromagnetic means operating said latch means; a photoelectric cell responsive to the color of the bread; an electron discharge tube for amplifying the current of said photoelectric cell; a relay controlled by said amplified current and operated upon the current attaining a predetermined magnitude; a switch operated by said relay; a circuit including said switch and said electromagnetic means; and means for varying the amplification of said electron discharge device for selecting the color of the bread at which the relay operates said switch in the electromagnetic circuit to release said latch.

21. In an electric toaster, a plurality of toasting compartments in either or both of which a slice of bread may be placed for toasting; heating elements; bread slice supports; a carriage for moving said supports to toasting position; means for automatically controlling the toasting operation in a plurality of said compartments by the condition of the toast in one of them; a main circuit closer for the heating elements operated by the carriage in moving to toasting position; and means, including bread engaging means, for opening the circuit automatically in the event the carriage is operated without a slice of bread on the support in the compartment which is automatically controlled.

22. In an electric toaster, a plurality of toasting compartments with heating elements and bread slice supports; a carriage for moving said supports to toasting position; a normally closed bread slice operated switch in one compartment to cause energization of the heating elements in both compartments to toast the bread therein; and a normally open bread slice operated switch in another compartment to cause energization of the heating elements in only one compartment to toast the bread therein, whereby the heating elements of one compartment alone are energized when a slice of bread is placed only in the compartment containing the normally closed switch, the heating elements of neither compartment are energized when a slice of bread is placed only in the compartment containing the normally open switch, and the heating elements of both compartments are energized when slices of bread are placed in both compartments.

23. In an electric toaster, a plurality of toasting compartments with heating elements and bread slice supports; a carriage for moving said supports to toasting position; a bread slice operated switch in one compartment to cause energization of the heating elements in both compartments to toast the bread therein; and a bread slice operated switch in another compartment to cause energization of the heating elements in only one compartment to toast the bread therein, whereby the heating elements of one compartment alone are energized when a slice of bread is placed only in a certain one of the compartments, the heating elements of neither compartment are energized when a slice of bread is placed only in the other compartment, and the heating elements of both compartments are energized when slices of bread are placed in both compartments.

ARTHUR A. JOHNSON.

REFERENCES CITED

The following references are of record in the file of this patent:

UNITED STATES PATENTS

| Number | Name | Date |
| --- | --- | --- |
| 2,110,748 | Tweedale | Mar. 8, 1938 |
| 2,036,210 | Graham | Apr. 7, 1936 |
| 2,057,384 | Lamb | Oct. 13, 1936 |
| 2,150,467 | Stain | Mar. 14, 1939 |
| 425,597 | Delany | Apr. 15, 1890 |
| 1,624,893 | Marsden | Apr. 12, 1927 |
| 2,171,520 | Biebel | Sept. 5, 1939 |
| 1,937,562 | Ginder | Dec. 5, 1933 |
| 1,870,768 | Comfort et al. | Aug. 9, 1932 |
| 2,075,000 | McCloud | Mar. 23, 1937 |
| 1,929,273 | Crago | Oct. 3, 1933 |
| 2,165,204 | Anderson | July 11, 1939 |
| 1,970,613 | McDill | Aug. 21, 1934 |
| 1,831,013 | Kouyoumjian | Nov. 10, 1931 |
| 992,021 | Marzeth | May 9, 1911 |
| 1,774,433 | Gardiner | Aug. 26, 1930 |
| 1,708,522 | Pross | Apr. 9, 1929 |
| 2,257,883 | McCarthy | Oct. 7, 1941 |
| 2,307,347 | Anderson | Jan. 5, 1943 |

FOREIGN PATENTS

| Number | Country | Date |
| --- | --- | --- |
| 238,066 | Great Britain | Aug. 13, 1925 |